United States Patent [19]

Glaze

[11] 4,030,580

[45] June 21, 1977

[54] DAMPING DEVICE FOR A VEHICLE SUSPENSION

[75] Inventor: Stanley George Glaze, Brierley Hill, England

[73] Assignee: Lucas Industries Limited, Birmingham, England

[22] Filed: Aug. 8, 1975

[21] Appl. No.: 602,998

[30] Foreign Application Priority Data

Aug. 15, 1974 United Kingdom ............ 35934/74

[52] U.S. Cl. .............................. 188/299; 188/313; 267/65 D

[51] Int. Cl.² ........................ F16F 9/19; F16F 9/34

[58] Field of Search ............... 267/65 R, 65 D, 113, 267/118, 120, 126; 137/625.62; 188/285, 299, 313; 280/707

[56] References Cited

UNITED STATES PATENTS

| | | | |
|---|---|---|---|
| 3,024,810 | 3/1962 | Barlow | 137/625.62 X |
| 3,101,650 | 8/1963 | Blanton | 137/625.62 X |
| 3,171,329 | 3/1965 | Rasmussen | 137/625.62 X |
| 3,211,063 | 10/1965 | Seamone | 137/625.62 X |
| 3,572,363 | 3/1971 | Roach | 188/299 X |
| 3,741,582 | 6/1973 | Eckert | 267/65 D X |

FOREIGN PATENTS OR APPLICATIONS

| | | | |
|---|---|---|---|
| 1,367,320 | 9/1974 | United Kingdom | 267/65 D |
| 1,382,318 | 1/1975 | United Kingdom | 267/65 D |

*Primary Examiner*—Johnny D. Cherry
*Attorney, Agent, or Firm*—Andrus, Sceales, Starke & Sawall

[57] ABSTRACT

An electrically-controlled damping device for use in a vehicle suspension includes a cylinder, a piston slidable in the cylinder and a damping control valve controlling the interconnection of the two ends of the cylinder. The valve is servo-operated by means of an electrical pilot valve and hydraulic working fluid for the servo-system is supplied from the cylinder itself through the intermediary of a bridge rectifier arrangement of one-way valves.

3 Claims, 1 Drawing Figure

U.S. Patent  June 21, 1977  4,030,580
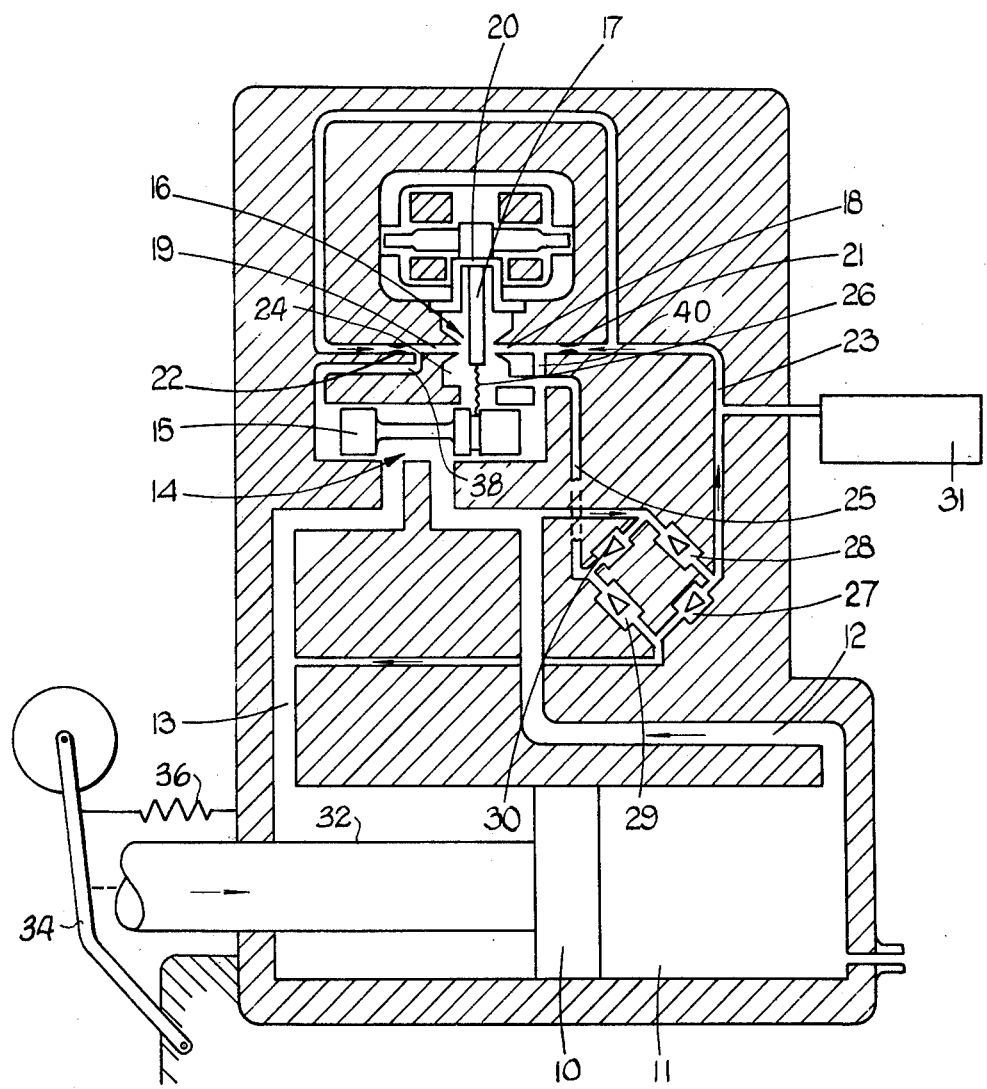

DAMPING DEVICE FOR A VEHICLE SUSPENSION

BACKGROUND OF THE INVENTION

Description of the Prior Art

It has been proposed to vary the damping applied to wheel carriers in a road vehicle wheel suspension system electrically to obtain desirable displacement/acceleration characteristics as is disclosed in our U.S. Patent Application Ser. No. 500,577 filed Aug. 26, 1974, now U.S. Pat. No. 3,995,883, which is uncorporated herein by reference. In general terms, however, a relatively low power electrical signal should desirably be used and this leads to problems in obtaining sufficient power to operate a damping control valve. A natural choice would be to use an electro-hydraulic servo-mechanism to operate the valve but this would require a source of hydraulic power to operate the valve.

Summary of the Present Invention

The present invention has for its object to provide an electrically controlled hydraulic damping device in which no external hydraulic pressure source is required.

A damping device in accordance with the invention comprises a cylinder, a piston slidable in the cylinder, a damping control valve controlling the interconnection of the two ends of the cylinder, an electrically actuable pilot valve for controlling the connection of the damping control valve to high and low pressure lines, and an array of nonreturn valves connecting the ends of the cylinder to said pressure lines and arranged to permit fluid flow only from the cylinder to the high pressure line and from the low pressure line to the cylinder.

BRIEF DESCRIPTION OF THE DRAWING

An example of the invention is shown diagrammatically in the accompanying drawing which is a section through the damping device.

DETAILED DESCRIPTION OF THE PREFERRED EMBODIMENT

The damping device shown includes a piston 10 slidable in a cylinder 11. As shown schematically in the drawing, rod 32 of piston 10 may be connected to the wheel carrier 34 in the suspension system. The body of cylinder 11 is connected to the vehicle body so that the damping device is connected across spring 36. Movements in the suspension system thus result in movement of piston 10 and of the hydraulic fluid in cylinder 11. The ends of cylinder 11 are interconnected via passages 12, 13 controlled by a valve 14. The valve 14 includes a spool 15 slidable in a bore in the valve body by fluid pressure applied to the ends of the spool 15. Spool 15 forms a variable orifice in passages 12 and 13 which controls the damping action of the damping device.

For controlling the supply of fluid pressure to the valve 14 there is a pilot valve 16 of the flapper type. The flapper 17 of the pilot valve is situated between two coaxial nozzles 18, 19 and is movable by an electromagnetic torque motor 20 along the common axis of the nozzles so as to control the relative degrees of opening of the nozzles. Torque motor 20 may be energized by an electric signal indicative of the amount of damping action to be provided by the damping device. The nozzles are connected via two flow restrictors 21, 22 to a fluid supply line 23 which receives fluid having a high pressure generated by piston 10 in chamber 11, in a manner hereinafter described. Both nozzles 18 and 19 open into a chamber 24 connected to a fluid line 25 leading to the low pressure side of piston 10. The two ends of the bore in which the spool 15 is slidable are connected to tappings 38 an 40 from the nozzles 18, 19, downstream of the restrictors 21, 22.

Thus when high and low pressures are present in the lines 23, 25 respectively and the flapper 17 is midway between the nozzles 18, 19, there will be equal flows from the two nozzles and equal pressures applied to the two ends of the spool 15. Should the flapper 17 be displaced towards the nozzle 18 the flow from the nozzle 18 will be decreased and that from the nozzle 19 increased so that the pressure applied to the right hand end of the valve spool 15 will exceed that applied to its left hand end and the spool 15 will move to the left. Similarly if the flapper 17 is moved towards the nozzle 19 the spool 15 will be moved to the right.

The flapper 17 is connected to the valve spool 15 by a light spring 26. This introduces negative feedback into the servo-system so that when a given current signal is applied to the torque motor the spool will take up a corresponding position. Thus, for example, when a current signal is applied to displace the flapper 17 towards the nozzle 19, the spool 15 will move to the right and the feedback force applied to the flapper 17 via the spring 26 will urge the flapper away from the nozzle 19. When the feedback force applies to the flapper a torque equal and opposite the torque applied by the motor an equilibrium position will be attained.

The position of spool 15 determines the rate at which fluid may pass between passages 12 and 13, the rate at which piston 10 can move, and the damping action provided to spring 36.

The fluid lines 23 and 25 are connected by an array of non-return valves 27, 28, 29 and 30 to the two passages 12 and 13, to operate in the manner of a bridge rectifier. Fluid at a sufficient pressure can flow from either end of the cylinder 11 to the high pressure line 23 and low pressure fluid from the line 25 can be drawn into the ends of the cylinder.

The operation of non-return valves 27 through 30 is shown by the arrows in FIG. 1. The arrow on rod 32 indicates piston 10 is moving to the right. This generates high pressure in the right hand side of cylinder 11 and low pressure in the left hand side. The high pressure flows in the direction of the arrow in passage 12 into the upper end of the valve array, also as shown by the arrow. This pressure opens valve 28 allowing the high pressure to enter line 23 as shown by the arrow. The low pressure return is provided through fluid line 25 and valve 29 to passage 13 as indicated by the discharge arrow at the lower end of the valve array.

An accumulator 31 may be connected to the line 23. No external fluid pressure source is required.

I claim:

1. A damping device for a vehicle suspension interposed between the vehicle body and a wheel movable with respect thereto, said damping device being responsive to a damping control signal and comprising:

a fluid containing cylinder connectable to one of said vehicle body or wheel;

a piston slidable in the cylinder and connectable to the other of said vehicle body or wheel;

a pair of fluid passages having first and second ends, the first end of one of said fluid passages being in fluid communication with one end of said cylinder, the first end of the other of said fluid passages being in fluid communication with the other end of said cylinder;

a damping control valve connected to the second ends of said fluid passages and containing a movable means establishing a variable orifice in said passages which controls the rate of fluid flow between the ends of said cylinder and the damping action of said damping device;

an electrically actuatable pilot valve means operable, responsive to the damping control signal, by the pressures existing between a high pressure supply line to said pilot valve means and a low pressure discharge line from said pilot valve means for controlling said damping control valve; and an array of non-return valves interposed between the ends of said cylinders and said supply and discharge lines for said pilot valve means and arranged to permit fluid flow only from said cylinder to said high pressure supply line and from said low pressure discharge line to said cylinder.

2. A damping device as claimed in claim 1 in which there is a pressure accumulator connected to the high pressure line.

3. A damping device as claimed in claim 1 wherein said array of non-return valves is arranged in a bridge configuration having a first pair of fluid conduit junctions, one of said junctions being connected to one end of said cylinder, the other of said junctions being connected to the other end of said cylinder; a second pair of fluid conduit junctions, one of said junctions of said second pair being connected to said high pressure supply line and the other junction of said second pair being connected to said low pressure discharge line; and a plurality of bridge arm conduits connecting each of said junctions of said first pair with each of said junctions of said second pair, one of said non-return valves being interposed in each of said conduits and arranged so as to permit fluid to flow from said cylinder to said high pressure supply line and from said low pressure discharge line to said cylinder.

* * * * *